(12) United States Patent
Lieber (10) Patent No.: US 9,397,828 B1
(45) Date of Patent: Jul. 19, 2016

(54) EMBEDDING KEYS IN HARDWARE (71) Applicant: Google Inc., Mountain View, CA (US)

(72) Inventor: Zeev Lieber, Toronto (CA)

(73) Assignee: Google Inc., Mountain View, CA (US)

( * ) Notice: Subject to any disclaimer, the term of this patent is extended or adjusted under 35 U.S.C. 154(b) by 3 days.

(21) Appl. No.: 14/276,717

(22) Filed: May 13, 2014

(51) Int. Cl.
H04L 9/08 (2006.01)

(52) U.S. Cl.
CPC ............. *H04L 9/083* (2013.01); *H04L 2209/24* (2013.01)

(58) Field of Classification Search
CPC ..... H04L 9/083; H04L 63/062; H04L 9/0891; H04L 2209/80; H04W 12/04
USPC ........................................................ 380/279
See application file for complete search history.

(56) References Cited

U.S. PATENT DOCUMENTS

| 8,369,528 | B2 | 2/2013 | Kwak et al. | |
|---|---|---|---|---|
| 8,600,061 | B2 | 12/2013 | Dellow | |
| 2009/0199303 | A1 | 8/2009 | Ahn et al. | |
| 2009/0260064 | A1* | 10/2009 | McDowell | G06F 21/10 726/4 |
| 2012/0155639 | A1* | 6/2012 | Oney | H04L 9/0822 380/236 |
| 2013/0003969 | A1 | 1/2013 | Farrugia et al. | |
| 2013/0152180 | A1 | 6/2013 | Nair et al. | |
| 2013/0163764 | A1 | 6/2013 | Van Den Berg et al. | |
| 2014/0044265 | A1 | 2/2014 | Kocher et al. | |

OTHER PUBLICATIONS

Tsung-Han Tsaiu; Design and Implementation of a Joint Data Compression and Digital Watermarking System in an MPEG-2 Video Encoder; Feb. 2014; Kluwer Academic Publishers; Journal of Signal Processing Systems vol. 74 Issue 2.*
Benoit Libert; Fully forward-secure group signatures; Jan. 2012; Springer-Veriag Publlisher; Full Text.*

* cited by examiner

*Primary Examiner* — Kambiz Zand
*Assistant Examiner* — Stephen Sanders
(74) *Attorney, Agent, or Firm* — Fish & Richardson P.C.

(57) ABSTRACT

Methods, systems, and apparatus, including computer programs encoded on a computer storage medium, for embedding keys in hardware. One of the methods includes providing, to a device provider, one or more encrypted keys, each of the encrypted keys to be included in a corresponding device provided by the device provider. A user system that includes a device that includes one of the encrypted keys receives information specifying the encrypted key. The information received from the user system is validated. A decryption key is selected based on the information received from the user system that is configured to decrypt the encrypted key specified by the information received from the user system. The decryption key is provided to the user system that includes the device.

20 Claims, 4 Drawing Sheets

EMBEDDING KEYS IN HARDWARE

BACKGROUND

This specification relates to digital rights management ("DRM") keys in user devices.

A number of DRM systems require the embedding of a DRM key into hardware at the manufacturing time of the hardware. Examples include Digital Transmission Content Protection (DTCP), Content Protection for Recordable Media (CPRM), and others. The DRM keys are usually purchased from appropriate authority and delivered to the purchasing entity or "Adopter." The keys are usually embedded in a One-Time-Programmable (OTP) module of a DRM chip, or any other device that stores the key with appropriate protection. The DRM devices are integrated into user systems, e.g., media players, and the user systems use the DRM keys to access protected content over a network. For example, a user system can obtain an encrypted stream of content, e.g., a movie or television show, and use an internal DRM key to decode the stream.

SUMMARY

This specification describes technologies relating to embedding keys in hardware.

In general, one innovative aspect of the subject matter described in this specification can be embodied in methods that include the actions of: providing, to a device provider, one or more encrypted keys, each of the encrypted keys to be included in a corresponding device provided by the device provider; receiving, from a user system that includes a device that includes one of the encrypted keys, information specifying the encrypted key; validating the information received from the user system, and in response to validating the information: selecting a decryption key based on the information received from the user system that is configured to decrypt the encrypted key specified by the information received from the user system; and providing the decryption key to the user system that includes the device. Other embodiments of this aspect include corresponding systems, apparatus, and computer programs, configured to perform the actions of the methods, encoded on computer storage devices.

These and other embodiments can each optionally include one or more of the following features. The actions include providing, to the device provider, a plurality of device identifiers, wherein each device identifier is to identify a respective device and is paired with one encrypted key; and wherein: receiving information specifying the encrypted key comprises receiving a device identifier of a device included in a user system; selecting a decryption key based on the information received comprises: accessing a database of decryption keys, wherein the database comprises an index that maps a device identifier to a decryption key; and obtaining a decryption key from the database of decryption keys. Information specifying the encrypted key is a MAC address of a respective device. The actions include receiving, from the device provider, a plurality of device identifiers, wherein each device identifier is to identify a respective device and is paired with one encrypted key; and wherein: receiving information specifying the encrypted key comprises receiving a device identifier of a device included in a user system; selecting a decryption key based on the information received comprising: accessing a database of decryption keys, wherein the database comprises an index that maps a decryption key to a device identifier; and obtaining a decryption key from the database of decryption keys. The actions include providing, to the device provider, a plurality of device identifiers, wherein each device identifier is to identify a respective device and is paired with one encrypted key; and wherein: receiving information specifying the encrypted key comprises receiving a device identifier of a device included in a user system; selecting a decryption key based on the information received comprises: computing a key derivation function with the device identifier and a master key; obtaining a decryption key from the key derivation function; and providing the decryption key to the user system that includes the device. The encrypted key is an encrypted DRM key. The actions include receiving account information identifying an account of a user of the user system; determining, from the received account information, that the user has a valid account; and validating the information received from the device included in the user system based in part on determining that the user has a valid account.

Particular embodiments of the subject matter described in this specification can be implemented so as to realize one or more of the following advantages. An adopter can encrypt keys and provide the encrypted keys to a device manufacturer to have devices manufactured with the DRM keys. Because the keys are encrypted, the adopter can ensure that the unencrypted DRM keys are not provided to the manufacturer, or anyone outside of the company's immediate authority, thus keeping the keys secret. A user can purchase or receive a user system, and request that a decryption key be provided from the adopter, which facilitates the use of the device. Thus the adopter, by providing encrypted keys to a device manufacturer, and then providing a key for decryption to a user system that incorporates one of the devices, eliminates the risk of key compromise at the manufacturer's site.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An adopter can obtain keys, e.g., digital rights management keys ("DRM"), encrypt the keys, and provide the encrypted keys to a device provider to be included in manufactured devices. The device provider can be, for example, a device manufacturer that receives chips, includes a DRM key in each chip, manufactures devices that each include a chip, and then provides the devices to third parties for incorporation into user systems. The adopter encrypts the keys using a unique encryption key for each device to be manufactured.

The encryption helps ensure that the key remains secret outside of the adopter, i.e., the device provider only has knowledge of the encrypted keys, and not the unencrypted keys. The device provider can then include in each device an encrypted key and provide each device for further incorporation into a user system that includes the device. The device provider may, in some implementations, provide information to the adopter mapping the devices to the encrypted keys, e.g., an identifier of a device, such as a MAC address, and data specifying the encrypted key for that device.

At a later time, the adopter receives information specifying the encrypted key from a user system that incorporates the device. For example, a user can purchase the user system that includes the device, and set the system up for an initial use, e.g., create an account with the adopter, sign into a pre-existing account, and so on. The information specifying the encrypted key can be a device identifier, e.g., a MAC address or a serial number, or any other information appropriate to resolve a particular encrypted key issued by the adopter to the device. The adopter can then validate the received information, e.g., check the received encrypted key against a database of encrypted keys.

After validating the received information, the adopter can select a decryption key and provide it to the user system. The adopter can select the decryption key using the received information specifying the encrypted key. For example, the adopter can match the information specifying the encrypted key to a decryption key using a database, or can provide a derived key from a master encryption key and a device identifier. The decryption key is then used to decrypt the encrypted key in the device.

These features and additional features are described in more detail below.

Figure 1:
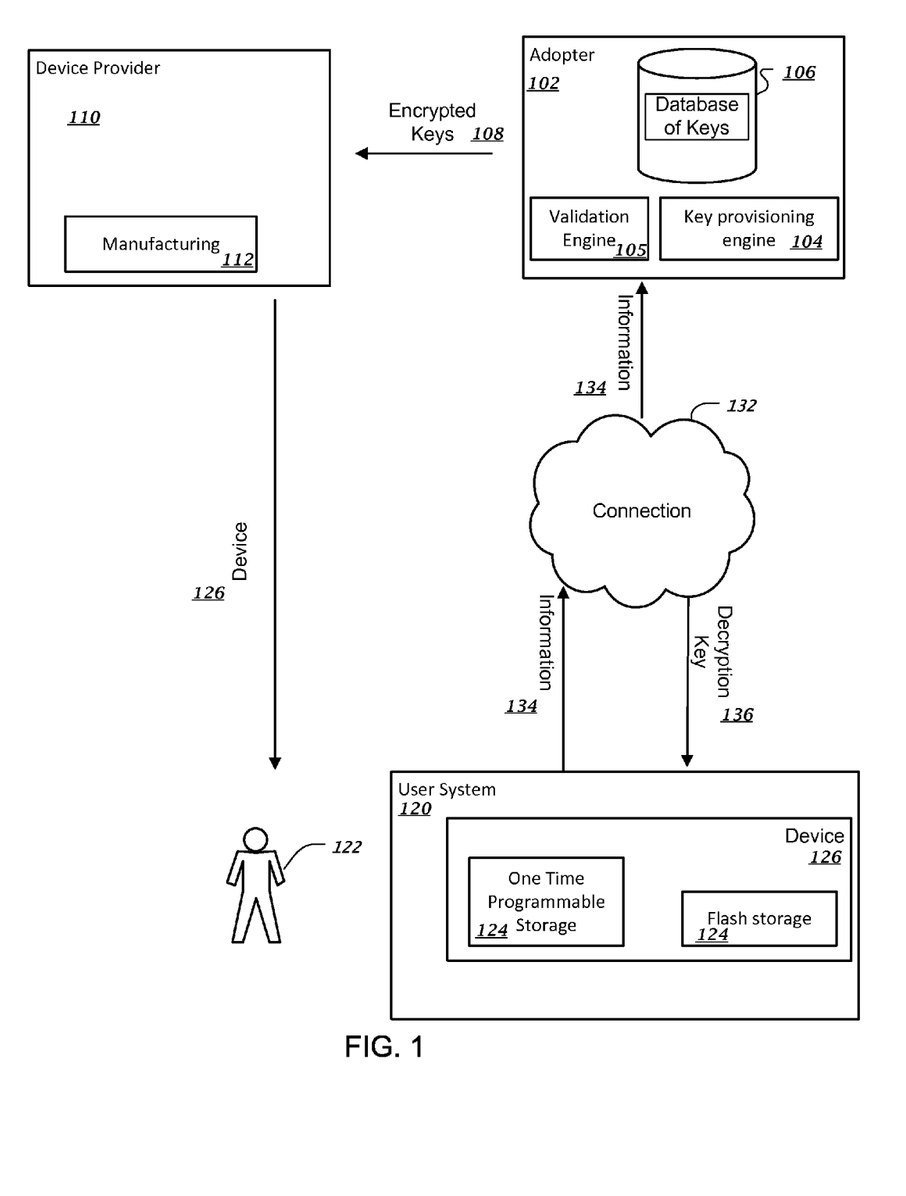
FIG. 1 is a block diagram of an example environment to embed keys in hardware.

FIG. 1 is a block diagram of an example environment 100 to embed keys in hardware. The adopter 102 is an entity that manages DRM keys, and administers a system that is implemented as computer programs on one or more computers in one or more locations. For convenience, actions attributed to the "adopter 102" are to be understood as actions performed by computer systems that are administered by the adopter entity, and references to the "adopter" are to be understood to be references to the adopter system.

The adopter 102 includes a key provisioning engine 104 to provide encrypted keys 108, e.g., encrypted DRM keys, to a manufacturer to be included in devices 126. The keys, once decrypted, can allow users 120 to access protected content, e.g., movies, music, or software, through the device 126. The key provisioning engine 104 can access a database of keys 106, i.e., a database or data structure that includes keys, and encrypt the keys to be included in manufactured devices, e.g., device 126. For example, the key provisioning engine 104 can obtain or generate device identifiers for devices and pair each device identifier with one encrypted key. The device identifiers can include a media access control ("MAC") address, or a serial number if such serial numbers are known. In some implementations the key provisioning engine 104 can pair one device identifier with one encrypted key, and provide the pairs 108 to a manufacturer/device provider 110. In other implementations the key provisioning engine 104 can encrypt the keys with derived keys from a master encryption key and device identifiers, and provide the encrypted keys 108 to the manufacturer. In still other implementations the key provisioning engine 104 can provide encrypted keys 108 and device identifiers. The manufacture then pairs the encrypted keys 108 with the device identifiers during manufacturing, and provides the pairs to the adopter 102.

The device provider 110 can include manufacturing 112 capabilities to create the devices 126. The device provider 110 receives the encrypted keys 108, and uses its manufacturing capabilities 112 to include them in devices 126 that are then incorporated into user systems and provided to users, e.g., user 122. The user systems can be provided to users by the device provider 110, the adopter 102, or a third party, e.g., a store, or distribution company. The device provider 110 may also manufacture the user systems, or, alternatively, provide the devices 126 to another entity that manufactures the user systems.

In the implementations in which the device provider 110 receives paired device identifiers and encrypted keys 108 from the adopter 102, each pairing informs the device provider 110 which device to include with which encrypted key, e.g., the device provider 110 can manufacture a device with express knowledge of the encrypted key to include. In the implementations in which the device provider 110 can itself determine how to pair device identifiers with encrypted keys 108, the manufacture may provide the pairing to the adopter 102.

As described above, device 126 can be included in a user system 120 and provided to a user 122 by the device provider 110 or a third party. The device includes one-time programmable storage ("OTP") 124 that contains an encrypted key, and flash storage 124.

The user system 120 provides the adopter 102 with information 134 specifying the encrypted key in the OTP 124 through a connection 132, e.g., the Internet. The information can be provided from the user system 120 to an installer, who then provides the information to the adopter 102. The information may be provided during a set-up process or other initialization process. The information can include a MAC address of the device, a serial number of the device, or a combination thereof. The information 134 is provided to a validation engine 105 included in the adopter 102 to validate the information and provide a decryption key 136 from the key provisioning engine 104.

The validation engine 105 receives information 134 specifying the encrypted key in the OTP 124. The information 134 specifying the encrypted key can be a device identifier, e.g., a MAC address or a serial number, or a combination thereof, depending on how the adopter 102 is configured to manage the inventory of encrypted keys. The validation engine 105 can then validate the received information 134 by checking the received encrypted key against a database of encrypted keys. In some implementations the validation engine 105 can validate user account information, and whether or not the key has previously been requested.

Provided the information is validated, the key provisioning engine 104 then provides to the user system 120 a decryption key for the included device 126. The user system 120 receives a decryption key 136 from the adopter 102 to decrypt the device's 126 included encrypted key. In some implementations the decryption key 136 can be stored in flash storage 124 included in the device 126. In other implementations the decryption key 136 can be stored in the OTP 124 which permanently decrypts the device's 126 included encrypted key.

Figure 2:
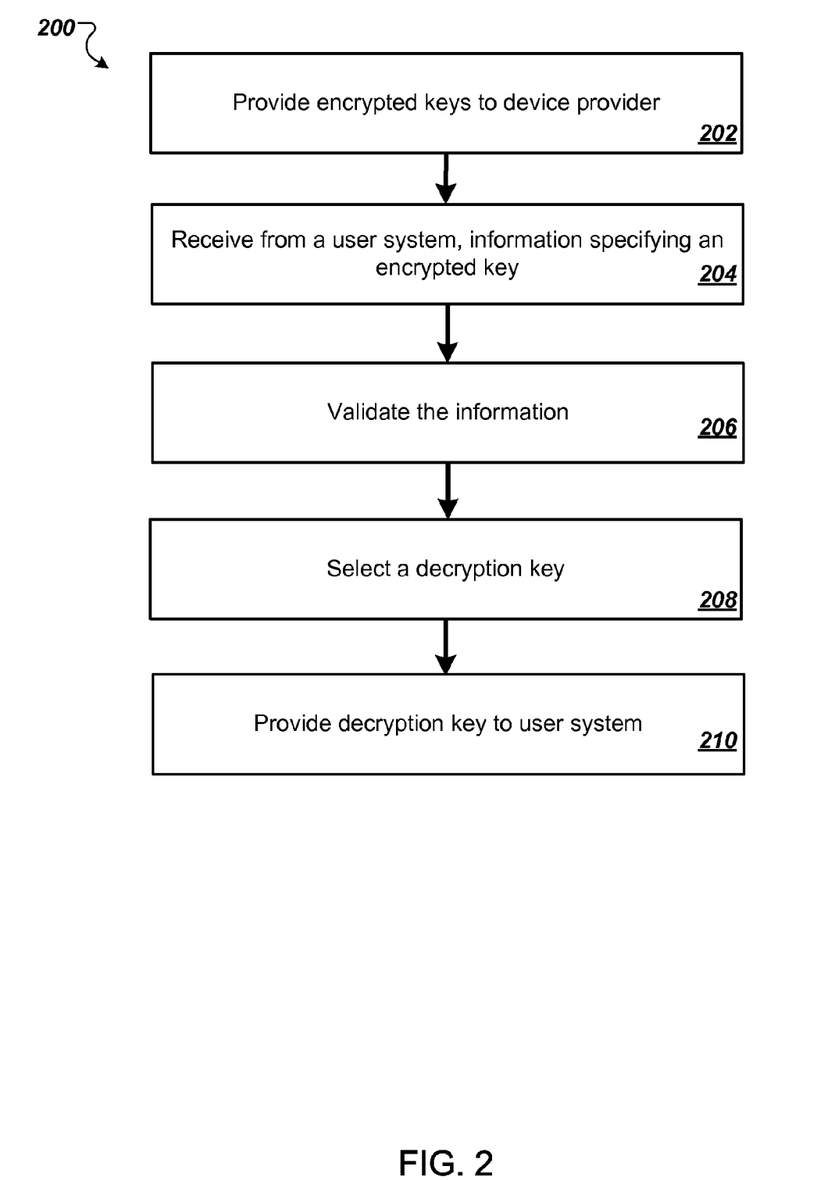
FIG. 2 is a flowchart of an example process to embed keys in hardware.

FIG. 2 illustrates an example process of embedding keys in hardware. The process 200 will be described as being performed by a system of one or more appropriately programmed computers, e.g., the adopter system 102 of FIG. 1.

The system provides encrypted keys to a device provider, e.g., a manufacturer of devices (step 202). The system obtains one or more keys, e.g., DRM keys, to include in manufactured devices. The keys, once decrypted, can be used by a device to access protected content from a content holder, e.g., a website or application that streams music, video, or text, or a software provider that allows access to proprietary software. In some implementations the keys can act as proof of authorization to access any arbitrary system. The system encrypts the obtained keys using a cryptographic function and encryption keys, e.g., DES, or AES, or a key derivation function, i.e., generating encryption keys from a master encryption key.

The encrypted keys can be managed in several appropriate ways. For example, in some implementations the system generates an encrypted key for each device to be manufactured with a respective unique encryption key, and stores a pairing for each device, e.g., an encrypted key included in the device and a respective device identifier for the device, in a device identifier database. Device identifiers can include a MAC address of a device to be manufactured, a serial number applied to the device after manufacturing (if such serial numbers are known). The system provides the stored pairings to the device adopter, who can then identify the specific encrypted key to include in each manufactured device. The system further pairs unique encryption keys, i.e., the encryption keys used with the cryptographic function to generate the encrypted keys, with device identifiers. The system stores the pairings as a mapping in a decryption key database or data structure. Providing a decryption key using uniquely encrypted keys is described below, with reference to FIG. 3.

In some implementations the system generates each encrypted key with a respective unique encryption key for each device to be manufactured, and provides encrypted keys to the device provider without determined pairings between encrypted keys and device identifiers. The system stores mappings between each unique encryption key, with the respective encrypted key. That is, the system pairs each unique encryption key with an encrypted key generated from the unique encryption key, and stores the pairs as a mapping in an encryption key database. The device provider then selects an encrypted key for each device to be manufactured, and stores the selection, e.g., the encrypted key paired with a particular device identifier, as a pairing. The device provider provides to the system a device identifier database that identifies the pairings of encrypted keys and device identifiers. The system accesses the device identifier database, locates an encrypted key, and obtains the mapped device identifier. The system then accesses the encryption key database, locates the same encrypted key, and obtains the mapped encryption key. The system maps the obtained device identifier with the obtained encryption key, and stores the mapping in a decryption key database. The system repeats this process for each encrypted key, creating a decryption key database that includes encryption keys mapped to device identifiers. Providing a decryption key using uniquely encrypted keys is described below, with reference to FIG. 3.

As described above, each key can be encrypted with a unique encryption key, and thus, during decryption, a corresponding unique decryption key can be obtained from a database and provided to decrypt the encrypted key. However, in some implementations, a database is not needed, and a key derivation function can be used to generate encryption keys from a single master key. In these implementations the system generates each encryption key with a master encryption key using a hash based key derivation function, e.g., hash-based message authentication code, or password-based key derivation function 2 (PBKDF2). The hash based key derivation function can use a device identifier of a device to be manufactured as an input to the key derivation function, and generate unique encryption keys for respective devices. Each key can then be encrypted using a unique encryption key, which is stored in a respective device, e.g., the device with the device identifier used to generate the unique encryption key. To decrypt the encrypted key, the system obtains a device identifier, and computes the key derivation function to generate the decryption key. Providing a decryption key using a master encryption key is described below, with reference to FIG. 4.

The system receives information specifying an encrypted key from a user system that includes a manufactured device (step 204). Each manufactured device can be included in an overall user system which a user can purchase or receive from an entity. Upon receipt of the user system the user can power the user system on, and set the user system up for operational use. For example, an installer can power the user system on, and transmit, e.g., through a network, the information. As described above, the user system can facilitate access to protected content from a content holder, e.g., a website or application that streams music, audio, or text, or a software provider that allows access to proprietary software. In some implementations the user system can act as proof of authorization to access any arbitrary system.

As described above, the information specifying an encrypted key can include a device identifier of the manufactured device included in the user system. The device identifier can be a serial number of the manufactured device, a MAC address, or any uniquely identifying arbitrary string.

The system validates the information specifying the encrypted key (step 206). The system validates the information to ensure that the manufactured device included in the user system is a validly received or purchased device.

Depending on the encrypted key management scheme used, the validation can be performed in one of the following example ways. In some implementations, the system includes a device identifier database that maps device identifiers to respective encrypted keys. The system can receive information specifying the encrypted key, e.g., a device identifier, and perform a check of the database or data structure to locate the received device identifier. Upon determining that the database or data structure includes the received device identifier, the system can validate that the manufactured device is valid.

In some implementations the system can further validate the information by receiving account information identifying an account of the user of the user system, and validating the account information. The account can be an account stored with the system, for example if the adopter, e.g., the controlling entity of the system, is a content holder that streams protected content, the account can specify that the user is a paying customer. Validation can further include verifying a geographic area of the request, a time window of a request and whether or not the encryption key has already been issued before. For instance, a time window can be determined from a time an installer of the user system is known to be, or arrive, on a customer's premises. Once satisfied, the Adopter will issue the encryption key to the requesting device.

Similarly, the adopter can be an entity that bridges outside content holders providing a method for them to provide their content to the user. The received account information can include authentication information to authenticate an account. Furthermore, the received account information can include a request to create an account in the system. The system can determine from the received account information whether the user has a valid account, or wants to create a valid account.

The system selects a decryption key to provide to the manufactured device included in the user system (step 208). The system determines a proper decryption key to provide from the received information specifying an encrypted key. Providing a decryption key using uniquely encrypted keys is described below, with reference to FIG. 3. Providing a decryption key using a master encryption key is described below, with reference to FIG. 4.

The system provides the decryption key to the manufactured device included in the user system (step 210). The system can provide the decryption key over the network.

In some implementations the decryption key can be stored in non-volatile memory of the manufactured device or user system. For example, the decryption key can be written to a flash memory that is connected to the encrypted key stored in the OTP, as described above with reference to FIG. 1. In some implementations the decryption key can be written to the OTP itself and permanently decrypt the encrypted key.

Figure 3:
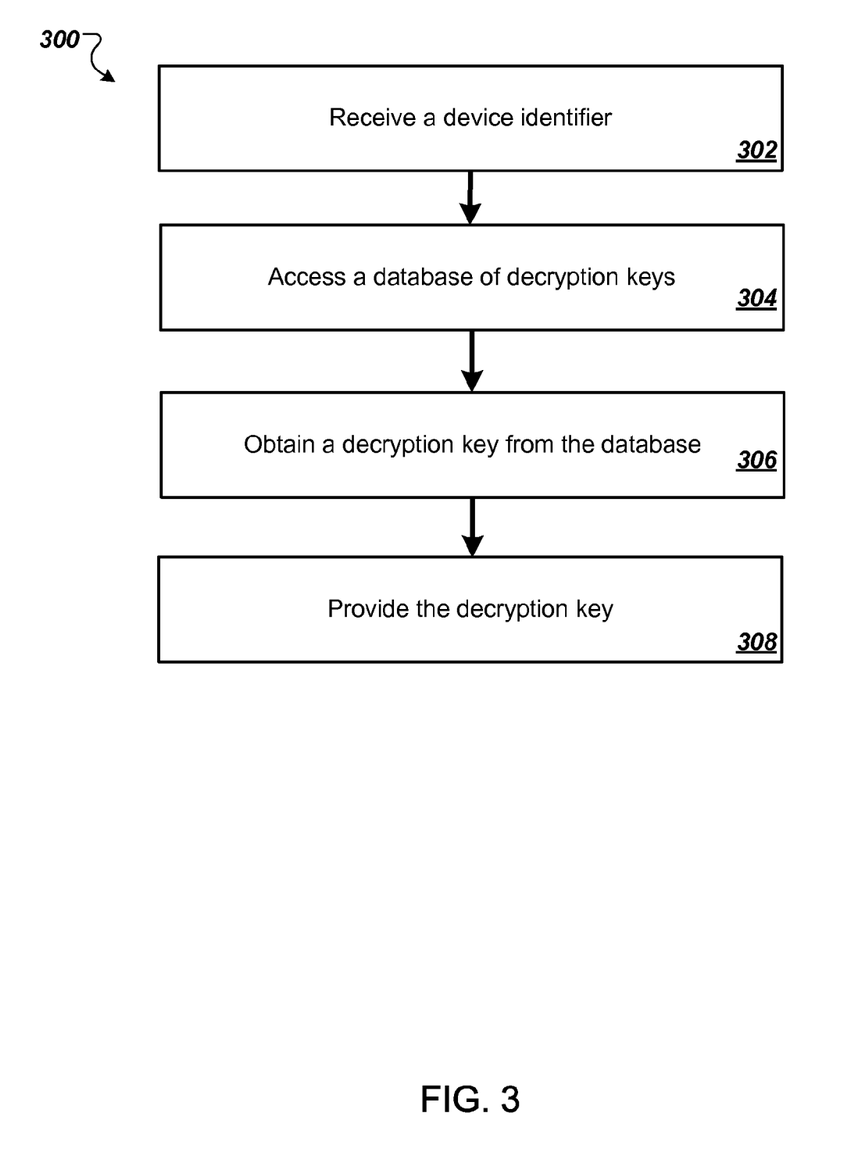
FIG. 3 illustrates an example process for providing a decryption key using uniquely encrypted keys.

FIG. 3 illustrates an example process 300 for providing a decryption key using uniquely encrypted keys. The process 300 will be described as being performed by a system of one or more appropriately programmed computers, e.g., the adopter system 102 of FIG. 1.

The system receives a device identifier from a user system that includes a manufactured device (step 302). The device identifier can be a serial number of the manufactured device, or a MAC address.

The system accesses a database of decryption keys (step 304). The database stores pairs of mappings between device identifiers and encryption keys, described above with reference to step 202.

The system obtains a decryption key from the decryption key database (step 306). The system identifies a mapping of the received device identifier with a corresponding encryption key. The system then obtains the identified encryption key as the decryption key.

The system provides the decryption key to the user system that includes the device (step 308). The user system then stores the decryption key in either flash memory or the OTP, described above with reference to FIG. 2.

Figure 4:
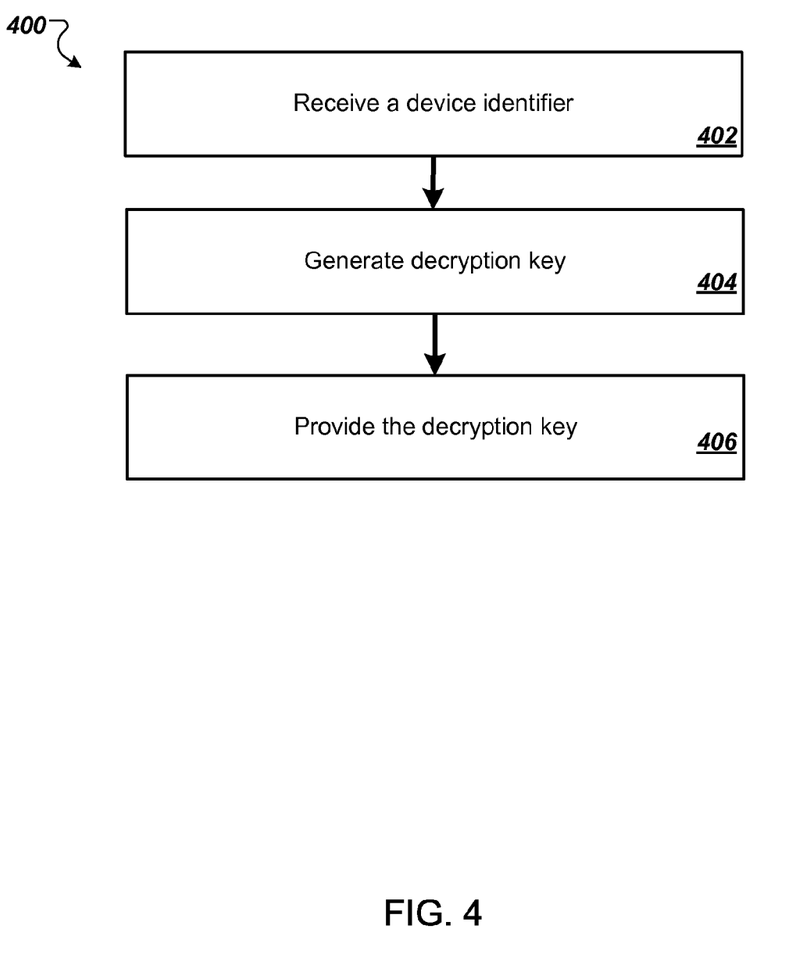
FIG. 4 illustrates an example process for providing a decryption key using a master encryption key.

FIG. 4 illustrates an example process 400 for providing a decryption key using a master encryption key. The process 400 will be described as being performed by a system of one or more appropriately programmed computers, e.g., the adopter system 102 of FIG. 1.

The system receives a device identifier from a user system that includes a manufactured device (step 402). The device identifier can be a serial number of the manufactured device, or a MAC address.

The system generates a decryption key from a device identifier and the master encryption key using a key derivation function. (step 404). In some implementations, the key derivation function can be a hash based message authentication code ("HMAC"). For example:

DecyrptionKey=HMAC(masterkey,deviceidentifier).

In other implementations the key derivation function can be computed using Password-Based Key Derivation Function 2 (PBKDF2).

The system provides the decryption key to the user system that includes a manufactured device (step 406). In some implementations the system can provide the decryption key to the user system over a network, e.g., the Internet, using an encryption method, e.g., Secure Socket Layer or Transport Layer Security. The user system then stores the decryption key in either flash memory or the OTP, described above with reference to FIG. 2. The user system decrypts the encrypted key in real-time when accessing protected content over a network. The decryption of the encrypted key may be further protected by performing it on a secure co-processor, using a secure key ladder or any other common key protection techniques employed by the DRM industry.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
providing, to a device provider by an adopter that is separate from the device provider, encrypted keys, each of the encrypted keys to be included by the device provider in a corresponding device provided by the device provider;
receiving, by the adopter and from a user system that includes a device provided by the device provider and that includes one of the encrypted keys, information specifying the encrypted key and that is based on a unique identifier of the device;
validating, by the adopter, the information received from the user system, and in response to validating the information:
selecting a decryption key based on the information received from the user system that is configured to decrypt the encrypted key specified by the information received from the user system; and
providing the decryption key to the user system that includes the device.

2. The method of claim 1, further comprising:
providing, to the device provider, a plurality of device identifiers, wherein each device identifier is to identify a respective device and is paired with one encrypted key; and wherein:

receiving information specifying the encrypted key comprises receiving a device identifier of a device included in a user system;

selecting a decryption key based on the information received comprises:

accessing a database of decryption keys, wherein the database comprises an index that maps a device identifier to a decryption key; and obtaining a decryption key from the database of decryption keys.

3. The method of claim 1, wherein information specifying the encrypted key is a MAC address of a respective device.

4. The method of claim 1, further comprising:

receiving, from the device provider, a plurality of device identifiers, wherein each device identifier is to identify a respective device and is paired with one encrypted key; and wherein:

receiving information specifying the encrypted key comprises receiving a device identifier of a device included in a user system;

selecting a decryption key based on the information received comprising:

accessing a database of decryption keys, wherein the database comprises an index that maps a decryption key to a device identifier; and obtaining a decryption key from the database of decryption keys.

5. The method of claim 1 further comprising:

providing, to the device provider, a plurality of device identifiers, wherein each device identifier is to identify a respective device and is paired with one encrypted key; and wherein:

receiving information specifying the encrypted key comprises receiving a device identifier of a device included in a user system;

selecting a decryption key based on the information received comprises:

computing a key derivation function with the device identifier and a master key;

obtaining a decryption key from the key derivation function; and providing the decryption key to the user system that includes the device.

6. The method of claim 1, wherein the encrypted key is an encrypted DRM key.

7. The method of claim 1, further comprising:

receiving account information identifying an account of a user of the user system;

determining, from the received account information, that the user has a valid account; and validating the information received from the device included in the user system based in part on determining that the user has a valid account.

8. A system, comprising:

a data store storing encrypted keys provided to a device provider by an adopter, each of the encrypted keys included, by the device provider, in a corresponding device provided by the device provider, the data store also storing information specifying the encrypted key for each device based on a unique identifier of the device;

an encrypted key manager comprising instructions executable by a processing system that includes one or more computers and upon such execution cause the processing system to perform operations comprising:

receiving, by the adopter and from a user system that includes a device provided by the device provider and that includes one of the encrypted keys, information specifying the encrypted key that is based on a unique hardware identifier of the device;

validating the encrypted key specified by the information received from the user system, and in response to validating the encrypted key:

selecting a decryption key based on the information received from the user device that is configured to decrypt the encrypted key specified by the information received from the user device; and providing the decryption key to the user system that includes the device.

9. The system of claim 8, wherein the instructions further comprise:

providing, to the device provider, a plurality of device identifiers, wherein each device identifier is to identify a respective device and is paired with one encrypted key; and wherein:

receiving information specifying the encrypted key comprises receiving a device identifier of a device included in a user system;

selecting a decryption key based on the information received comprises:

accessing a database of decryption keys, wherein the database comprises an index that maps a device identifier to a decryption key; and obtaining a decryption key from the database of decryption keys.

10. The system of claim 8, wherein information specifying the encrypted key is a MAC address of a respective device.

11. The system of claim 8, wherein the operations further comprise:

receiving, from the device provider, a plurality of device identifiers, wherein each device identifier is to identify a respective device and is paired with one encrypted key; and wherein:

receiving information specifying the encrypted key comprises receiving a device identifier of a device included in a user system;

selecting a decryption key based on the information received comprising:

accessing a database of decryption keys, wherein the database comprises an index that maps a decryption key to a device identifier; and obtaining a decryption key from the database of decryption keys.

12. The system of claim 8, wherein the operations further comprise:

providing, to the device provider, a plurality of device identifiers, wherein each device identifier is to identify a respective device and is paired with one encrypted key; and wherein:

receiving information specifying the encrypted key comprises receiving a device identifier of a device included in a user system;

selecting a decryption key based on the information received comprises:

computing a key derivation function with the device identifier and a master key;

obtaining a decryption key from the key derivation function; and providing the decryption key to the user system that includes the device.

13. The system of claim 8, wherein the encrypted key is an encrypted DRM key.

14. The system of claim 8, wherein the operations further comprise:

receiving account information identifying an account of a user of the user system;

determining, from the received account information, that the user has a valid account; and validating the information received from the device included in the user system based in part on determining that the user has a valid account.

15. A computer program product, encoded on one or more non-transitory computer storage media, comprising instructions that when executed by one or more computers cause the one or more computers to perform operations comprising:

providing, to a device provider by an adopter that is separate from the device provider, encrypted keys, each of the encrypted keys to be included by the device provider in a corresponding device provided by the device provider;

receiving, by the adopter and from a user system that includes a device provided by the device provider and that includes one of the encrypted keys, information specifying the encrypted key and that is based on a unique identifier of the device;

validating, by the adopter, the information received from the user system, and in response to validating the information:

selecting a decryption key based on the information received from the user system that is configured to decrypt the encrypted key specified by the information received from the user system; and providing the decryption key to the user system that includes the device.

16. The computer program product of claim 15, wherein the instructions further comprise:

providing, to the device provider, a plurality of device identifiers, wherein each device identifier is to identify a respective device and is paired with one encrypted key; and wherein:

receiving information specifying the encrypted key comprises receiving a device identifier of a device included in a user system;

selecting a decryption key based on the information received comprises:

accessing a database of decryption keys, wherein the database comprises an index that maps a device identifier to a decryption key; and obtaining a decryption key from the database of decryption keys.

17. The computer program product of claim 15, wherein the operations further comprise:

receiving, from the device provider, a plurality of device identifiers, wherein each device identifier is to identify a respective device and is paired with one encrypted key; and wherein:

receiving information specifying the encrypted key comprises receiving a device identifier of a device included in a user system;

selecting a decryption key based on the information received comprising:

accessing a database of decryption keys, wherein the database comprises an index that maps a decryption key to a device identifier; and obtaining a decryption key from the database of decryption keys.

18. The computer program product of claim 15, wherein the operations further comprise:

providing, to the device provider, a plurality of device identifiers, wherein each device identifier is to identify a respective device and is paired with one encrypted key; and wherein:

receiving information specifying the encrypted key comprises receiving a device identifier of a device included in a user system;

selecting a decryption key based on the information received comprises:

computing a key derivation function with the device identifier and a master key;

obtaining a decryption key from the key derivation function; and providing the decryption key to the user system that includes the device.

19. The computer program product of claim 15, wherein the encrypted key is an encrypted DRM key.

20. The computer program product of claim 15, wherein the operations further comprise:

receiving account information identifying an account of a user of the user system;

determining, from the received account information, that the user has a valid account; and validating the information received from the device included in the user system based in part on determining that the user has a valid account.

* * * * *